United States Patent [19]

Aoki et al.

[11] 4,393,390

[45] Jul. 12, 1983

[54] ELECTROSTATIC PRINTER

[75] Inventors: Kenji Aoki; Mitsuhiro Goto; Teiji Miura, all of Suwa, Japan

[73] Assignee: Kabushiki Kaisha Suwa Seikosha, Nagano, Japan

[21] Appl. No.: 190,149

[22] Filed: Sep. 24, 1980

[30] Foreign Application Priority Data

Sep. 28, 1979 [JP] Japan .............................. 54-126085
Sep. 28, 1979 [JP] Japan .............................. 54-126086
Sep. 28, 1979 [JP] Japan .............................. 54-126088

[51] Int. Cl.³ ............................................ G01D 15/06
[52] U.S. Cl. .................................................. 346/155
[58] Field of Search ...................... 346/153.1, 155, 156, 346/160.1, 162–165; 101/DIG. 13; 358/300

[56] References Cited

U.S. PATENT DOCUMENTS 2,527,599 10/1950 Terry .............................. 346/162 X
3,711,859 1/1973 Brown et al. ..................... 346/155
3,752,288 8/1973 Detig et al. ..................... 346/155 X

*Primary Examiner*—Thomas H. Tarcza

*Attorney, Agent, or Firm*—Blum, Kaplan, Friedman, Silberman & Beran

[57] ABSTRACT

An electrostatic printer for printing images on an electrostatic recording medium. The electrostatic printer includes an elongated electrode and a back electrode. The back electrode is spaced from the elongated electrode to define a gap therebetween. The gap, defined by the elongated electrode and the back electrode, is adapted to permit the passage of the electrostatic recording medium in a predetermined direction and is effectively reduced at a given point on the elongated electrode. The elongated electrode is displaceable relative to the back electrode so that the point on the elongated electrode which then defines the effectively reduced gap is displaced laterally of the direction of passage of the electrostatic recording medium in response to the displacement of the elongated electrode. A voltage is selectively applied between the elongated electrode and the back electrode for effecting printing on the electrostatic recording medium in registration with the point on the elongated electrode then defining the effectively reduced gap.

35 Claims, 45 Drawing Figures

ELECTROSTATIC PRINTER

BACKGROUND OF THE INVENTION

This invention relates generally to an electrostatic printer, and in particular, to an electrostatic printer which prints latent images on an electrostatic recording paper, which paper can be developed to allow the images formed to become visible.

The substantial reduction in cost of word processors, computers and the like has allowed many more consumers to purchase and operate such systems. Thus, the average consumer now has the financial means for purchasing a computer or word processing system, and with the reduction in complexity of such systems, can readily learn how to operate such a system. Before this advance, only experts in electronic data processing systems or similar systems had the specific technical knowledge required to operate such a computer system. The substantial cost reduction of such systems was due to the cost reduction of the system's component parts such as the central processing unit (CPU), memory and the like which resulted from the technological advances in semiconductor manufacturing. However, the technology of the printer portion of computers or word processing system has not kept pace with the rapidly expanding technology utilized in connection with other components of such systems.

The conventional electrostatic printer utilizable in connection with a computer system is generally driven only at low speeds. In order to provide high speed printing, an electrostatic printer which is complicated in structure, over sized and expensive, is necessary. Accordingly, the conventional high speed electrostatic printer could only be utilized for specialized purposes such as in the output terminal or line printer of a general-purpose computer.

The lack of advanced technology in electrostatic printers presents problems particularly recognized for word processors for Chinese characters. The word processor for Chinese characters which was previously unavailable, has become inexpensive enough to be brought into wide use. A user of a word processor for Chinese characters would prefer the printed output to be a mixed writing of Chinese characters with Japanese syllabary as opposed to Roman letters or square Japanese syllabary.

In the conventional electrostatic printer, the Chinese characters cannot be printed out at all since the resolution of such conventional printers is insufficient, although conventional electrostatic printers are generally sufficient to print out alpanumerical characters. Thus, a conventional electrostatic printer having a resolution of 5×7 dots or 9×11 dots is sufficient to print out alphanumerical characters but is insufficient to print Chinese characters. A resolution of about 32×32 dots is required to visibly print out Chinese characters.

In order to solve the resolution problem discussed above, the printing speed of the conventional electrostatic printer had to be substantially reduced. However, in a computer or word processing system, a high speed printer is desired and accordingly the printer becomes very expensive. The only printers that can meet the above requirements are optical type printers in which lasers or optical fiber tubes (OFT) are utilized, or electrostatic printers with a multi-stylus. Since both of these types of printers are very expensive, the cost of a complete system is increased thereby preventing the widespread acceptance and use of such computer or word processing systems. The above is true also in high speed facsimile or cathode ray tube (CRT) hard copiers. Accordingly, an electrostatic printer that is reliable, is inexpensive to manufacture and which provides good resolution and printing quality, is desired.

SUMMARY OF THE INVENTION

Generally speaking, in accordance with the instant invention, an electrostatic printer for printing on an electrostatic recording medium such as electrostatic paper, is provided. An elongated electrode is spaced from a back electrode so as to define a gap therebetween. An electrostatic recording medium travels in the gap in a predetermined direction. Means for effectively reducing the gap at a given point on the elongated electrode are provided. The elongated electrode is displaceable relative to the back electrode so that the point on the elongated electrode then defining the effectively reduced gap is displaced laterally of the direction of passage of the electrostatic recording medium in response to the displacement of the elongated electrode. A voltage is selectively applied between the back electrode and the elongated electrode with printing occurring on the recording medium in registration with the point on the elongated electrode then defining the effectively reduced gap.

Accordingly, it is an object of the instant invention to provide an improved electrostatic printer.

Another object of the instant invention is to provide an electrostatic printer which is relatively inexpensive to manufacture.

A further object of the instant invention is to provide an electrostatic printer which is reliable and provides good resolution and clarity.

A still further object of the instant invention is to provide an electrostatic printer having a high printing quality and printing speed while being compact in size.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 15 A is a perspective view of the signal generating portion of the electrostatic printer constructed in accordance with the instant invention;

DESCRIPTION OF THE PREFERRED EMBODIMENTS

Figure 1:
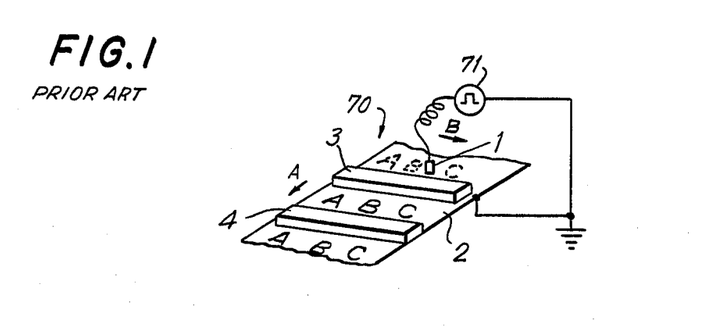
FIG. 1 is a perspective view of an electrostatic printer including a schematic circuit diagram constructed in accordance with the prior art.

Reference is first made to FIG. 1 wherein an electrostatic printer, generally indicated at 70, and constructed in accordance with the prior art, is depicted. An electrostatic recording medium or paper 2 travels between one or more pin electrodes 1 and a back electrode (not shown). Pin electrodes 1 form latent dot images on recording paper 2 by depositing charged particles thereon in response to pulse signals generated by a driving circuit 71. Electrostatic medium 2 advances in the direction of arrow A by a feeder mechanism or the like (not shown) and pin electrodes 1 mechanically scan across paper 2 in the direction of arrow B. Charged particles are deposited at selected locations thereby forming latent images such as the letters A, B and C depicted in phantom. The latent images formed are developed by toner applicator 3 which deposits dye particles which only adhere to paper 2 where the charged particles are deposited. The dye particles are then fixed by a fixing member 4. It is noted that it takes approximately one to five minutes to print a page of A 4 size because the speed of mechanical scanning in the direction of arrow B must be slow. Accordingly, printer 70 is generally used in low speed facsimile systems.

Figure 2:
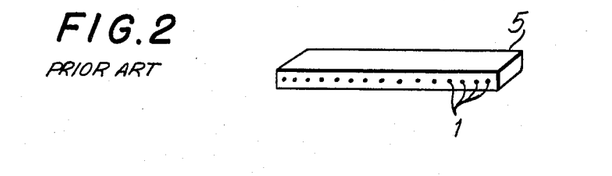
FIG. 2 is a perspective view of a multi-stylus utilizable in connection with the electrostatic printer of the prior art.

In order to eliminate the aforementioned low speed mechanical scanning by pin electrodes 1, which presents obstacles to increased printing speed, a conventional printer utilizing a multi-stylus electrode configuration in which a plurality of pin electrodes are molded into a substrate has been developed. Utilization of such a multi-stylus electrode member enables high speed printing for use in high speed facsimile or high speed line printers. FIG. 2 depicts a multi-stylus 5 wherein a plurality of stylus electrodes 1 are molded in a resin substrate having a width on the order of 20 cm. This construction will allow a resolution of 10 dots/mm for writing across the length of a line on a page of A 4 size. However, a printer utilizing a multi-stylus is expensive to manufacture.

Figure 3:
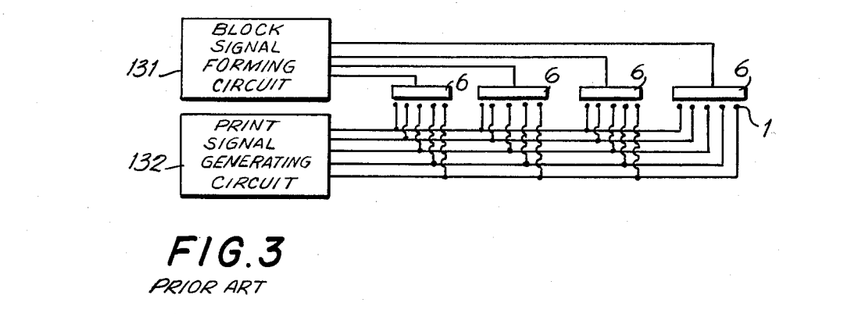
FIG. 3 is a schematic circuit diagram of a multiplex driving circuit constructed in accordance with prior art.

The space between stylus or pin electrodes 1 depicted in FIG. 2 in multi-stylus 5 is so narrow (about $50\mu$) that a conductive coupling is apt to be generated between the electrodes due to the floating capacity, thereby causing cross talk between the electrodes. Accordingly, it is necessary to control the form and position of the stylus electrodes or, alternatively, the potential and pulse width of the signal pulses which drive the electrodes. Accordingly, a driving circuit utilizing a conventional multiplex driving circuit as depicted in FIG. 3 is provided for driving pin electrodes 1. Controlling electrodes 6 are introduced into the circuit. Block signal forming circuit 131 drives controlling electrodes 6 and printing signal generating circuit 132 drives pin electrodes 1.

Figure 4:
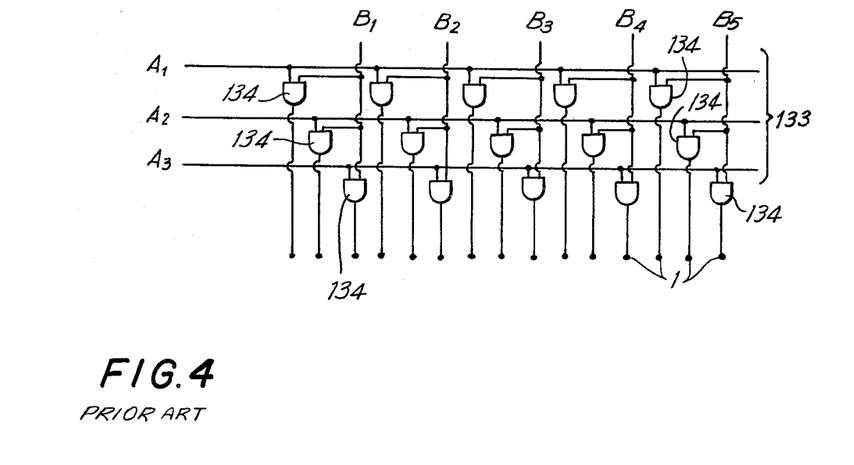
FIG. 4 is a schematic circuit diagram of an alternative embodiment of a multiplex driving circuit constructed in accordance with the prior art.

Alternatively, as depicted in FIG. 4, a conventional matrix driving circuit can be used to drive pin electrodes 1. Matrix 133 includes a plurality of inputs $A_1$ through $A_3$ and $B_1$ through $B_5$. These inputs are fed through matrix 133 which includes a plurality of AND gates 134, the coincidence of which is necessary in order to fire desired pin electrodes 1. Such driving circuits as those depicted in FIGS. 3 and 4 are complicated in structure and expensive, thereby further increasing the cost of a multi-stylus printer.

Another conventional embodiment of an electrostatic printer is a printer having matrix electrodes on both sides of the electrostatic recording medium. Such a printer is controlled and driven so that the printing is performed only when the voltage is applied to the electrodes on both sides of the recording medium. If there is an air gap between the electrodes and recording medium, the presence of an electrical potential in the air gap causes an irregular image to be formed on the recording medium and accordingly the electrodes must be placed in contact with the recording medium. In such a case, however, the electrodes must press heavily against the recording medium in order to obtain a sufficient contact and accordingly a rapid printing is impossible. When a voltage is applied to the electrodes which are in contact with the electrostatic recording medium, the current flows in a wide region and the printing will lack clarity. A further explanation of the above will be found in "Electrophotography", Vol. 7 No. 3, pp, 102–103 published by the Society of Electrophotography of Japan. See also, "Electrostatic Printing", Philips Technical Review, Vol. 36, 1976, No. 3 for further background.

Accordingly, the prior art electrostatic printers described above cannot provide a printing quality having a clarity and resolution which is sufficient to print out sophisticated images such as Chinese characters or the like. Also, the conventional electrostatic printer can only be driven at low speeds unless a multi-stylus system of electrodes is utilized. However, such a multi-stylus system of electrodes is complicated in structure, increases the size of electrostatic printers and increases the cost of such electrostatic printers. Hence, such prior art printers would only be feasible for use in large general purpose computer systems. The instant invention, as described in detail below, seeks to remedy these defects.

Figure 5:
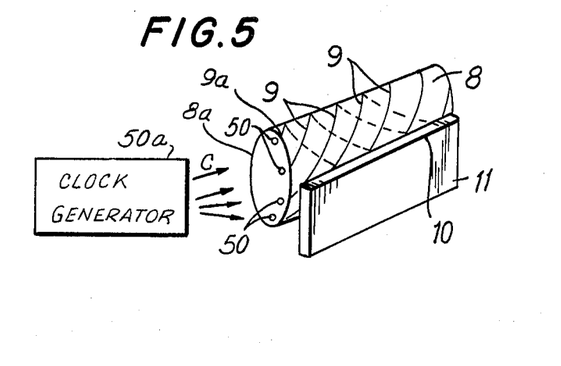
FIG. 5 is a perspective view of the signal generating portion of the electrostatic printer constructed in accordance with the instant invention.
Figure 16A:
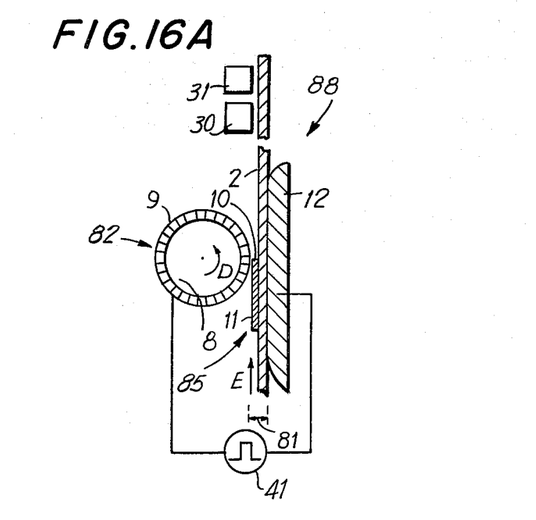
FIGS. 16A and 16B are schematic diagrams of an electrostatic printer constructed in accordance with the instant invention.

The construction and operation of the electrostatic printer in accordance with the instant invention will now be described. Reference is first made to FIGS. 5 and 16A wherein an electrostatic printer, generally indicated as 88, and constructed in accordance with the instant invention, is depicted. A writing signal generating portion 82 includes a cylindrical rotatable drum 8 having a plurality of line or elongated electrodes 9 which are spirally wound at equal distances. A first end 8a of drum 8 includes a plurality of light detecting members 50 which act as a timing mechanism is combination with clock generator 50a, one light detecting member 50 being provided for and coupled to a first end 9a of each elongated electrode 9. A back electrode 12 is suitably spaced from electrodes 9 on drum 8 thereby defining a gap 81 therebetween. A signal forming portion 85 includes a gap reducing member such as thin layer 11 which is located intermediate drum 8 and back electrode 12, thin layer 11 being substantially parallel to back electrode 12. An electrostatic recording medium or paper 2 passes intermediate thin layer 11 and back electrode 12 for movement therebetween. A signal generator 41 is coupled between back electrode 12 and the plurality of elongated line electrodes 9 on cylindrical drum 8. In the manner to be discussed in detail below, a latent image of charged particles is formed on recording medium 2 proximate end surface 10 of thin layer 11 in registration with the point on elongated electrodes 9 then passing by end surface 10. As recording medium 2 advances in the direction indicated by arrow E in FIG. 16A, the latent image formed on recording medium 2 is developed by a developing portion 30, the developed latent image being fixed to the recording medium by means of fixing portion 31.

Figure 7:
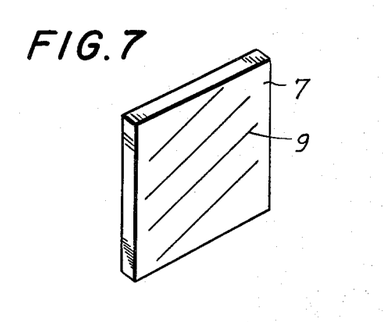
FIG. 7 is a perspective view of the plate depicted in FIG. 6 constructed in accordance with the instant invention.
Figure 8:
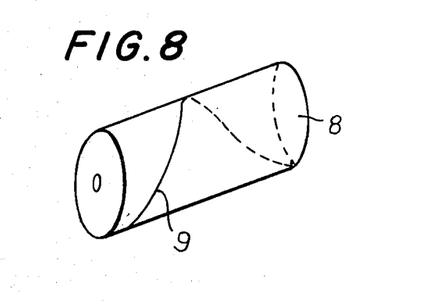
FIG. 8 is a perspective view of the cylindrical drum depicted in FIG. 5 constructed in accordance with the instant invention.

Referring now to FIGS. 7 and 8, it is noted that writing signal generating portion 82 depicted in FIG. 16A can be either a flat plate substrate 7 or a cylindrical drum substrate 8. One or more spaced elongated line electrodes 9 are provided on flat substrate 7 or cylindrical substrate 8. Line electrodes 9 may be made of a conductive wire which is affixed to the substrates 7 or 8 or may be formed on the substrates 7 or 8 by methods such as plating, deposition or photo chemical etching.

Figure 9A:
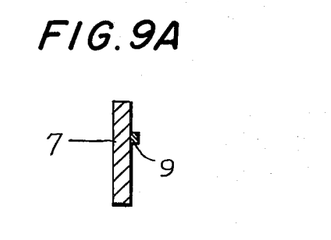
FIGS. 9A and 9B are sectional views of a plate and cylinder, respectively, constructed in accordance with the instant invention.
Figure 9B:
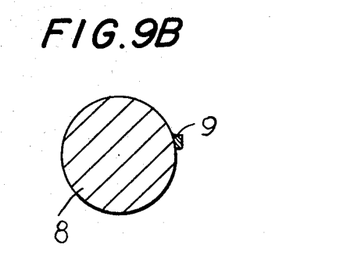
Figure 10A:
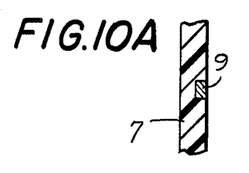
FIGS. 10A and 10B are sectional views of alternative embodiments of a plate and cylinder, respectfully, utilizable in connection with the instant invention.
Figure 10B:
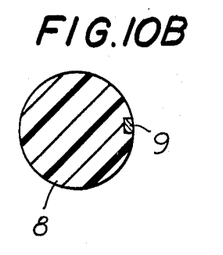
Figures 11A, 11B:
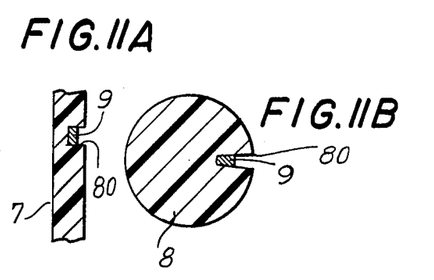
FIGS. 11A and 11B are sectional views of a plate and cylinder, respectfully, constructed in accordance with an alternative embodiment of the instant invention.

Substrates 7 and 8 may be constructed from a conductive material as illustrated in FIGS. 9A and 9B. In this case, line electrode 9 must be affixed to the outer surface of substrate 7 or 8. Conversely, if substrates 7 or 8 are formed from an insulating material, as depicted in FIGS. 10A, 10B, 11A and 11B, line electrode 9 can be embedded in substrates 7 or 8 so that a surface of electrode 9 is flush with the outer surface of substrates 7 or 8 as depicted in FIGS. 10A and 10B. Alternatively, elongated electrode 9 can be embedded within channel 80 formed in substrates 7 or 8 for receiving line electrode 9, as depicted in FIGS. 11A and 11B. It is noted that various other configurations of line electrode 9 and substrates 7 or 8 are possible.

Figure 12:
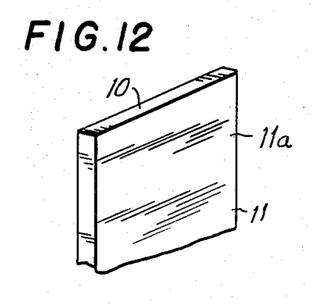
FIG. 12 is a partial perspective view of a gap reducing member constructed in accordance with the instant invention.
Figure 13:
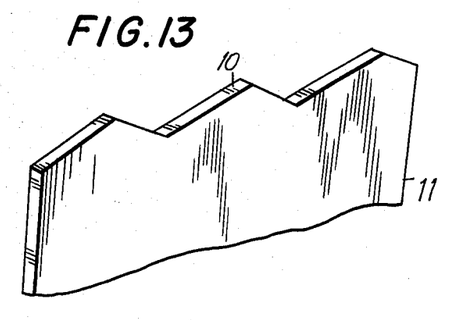
FIG. 13 is a partial perspective view of an alternative embodiment of a gap reducing plate of the instant invention.
Figure 14A:
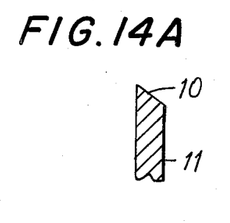
FIGS. 14A, 14B and 14C are alternative partial sectional views of gap reducing plates of the instant invention.
Figure 14B:
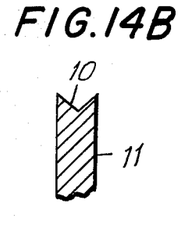
Figure 14C:
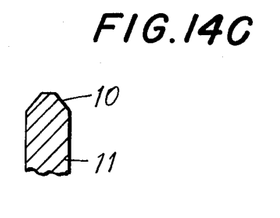

Signal forming portion 85 which acts as gap reducer, as depicted in FIG. 16A, is constructed of a thin layer or plate 11, having an end surface 10 as best illustrated in FIG. 12. End surface 10 can be straight as illustrated in FIG. 12 or, alternatively, can be jagged as depicted in FIG. 13, depending on the desired printing characteristics. Furthermore, end surface 10 can be a narrow strip or line having a sharp top, secrued to thin layer 11. Additionally, end surface 10 can have various section configurations as shown in FIGS. 14A, 14B and 14C.

Figure 15A:
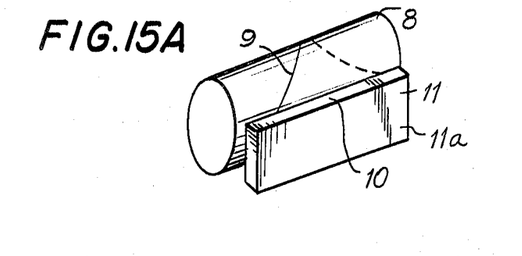
Figure 16B:
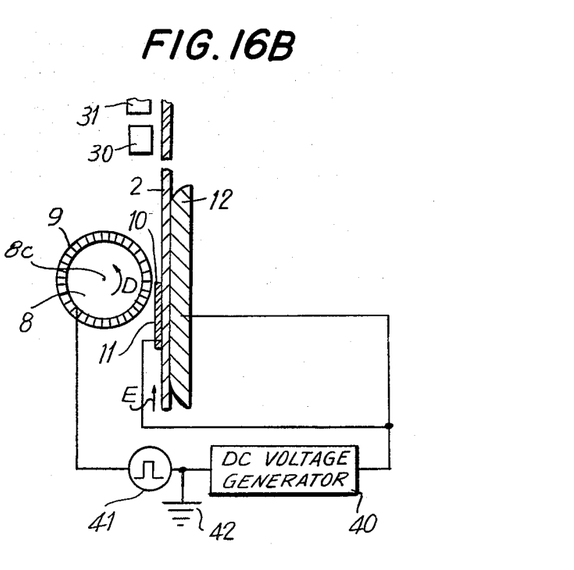

Reference is now made to FIGS. 15A, 16A and 16B in order to explain the principles of electrostatic printing in accordance with the present invention. Line electrode 9 is spirally wound on cylindrical drum 8 which rotates counter-clockwise in the direction of arrow D thereby moving a given point on elongated electrode 9 from one end of drum 8 to the other in a continuous fashion. Adjacent to drum 8 and substantially parallel to axis 8c thereof, a thin layer or plate 11 having an end surface 10 is positioned. A suitable space between elongated line electrode 9 and thin layer 11 is about 500μ. The shorter the space therebetween the smaller the dot size image formed on electrostatic medium 2 will be. However, electrode 9 should not make contact with thin layer 11 since abrasion and breakdown of the printer may occur.

A back electrode 12 is provided so that thin layer 11 lies intermediate back electrode 12 and line electrode 9 on drum 8. A gap 81 is thus provided between line electrode 9 and back electrode 12. The electrostatic recording medium or paper 2 is placed intermediate thin layer 11 and back electrode 12 and is fed therethrough by a feeding mechanism (not shown) in the direction of arrow E.

Figure 27:
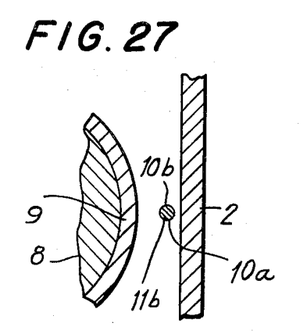
FIG. 27 is a partial schematic view of an electrostatic printer constructed in accordance with an alternative embodiment of the instant invention.
Figure 28:
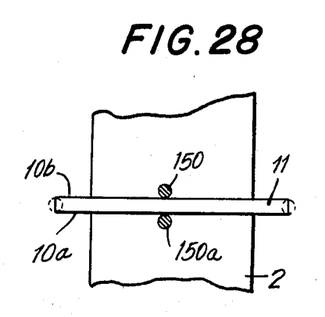
FIG. 28 is a partial front plan view of dots being formed on an electrostatic medium by the electrostatic printer depicted in FIG. 27.

The length of thin layer 11 in the vertical direction to the end surface 10 may be arbitrarily chosen. However, if the thin layer 11 is excessively short in the vertical direction and is therefore line-like such as 11b, depicted in FIG. 27, the thin layer will have two end surfaces 10a and 10b, thereby forming a dot on both sides thereof respectively, in the manner to be discussed below, on opposite sides of line like thin layer 11b. Accordingly, two dots 150 and 150a as shown in FIG. 28 will be printed on the electrostatic paper 2.

Figures 17, 18, 19, 20A, 20B:
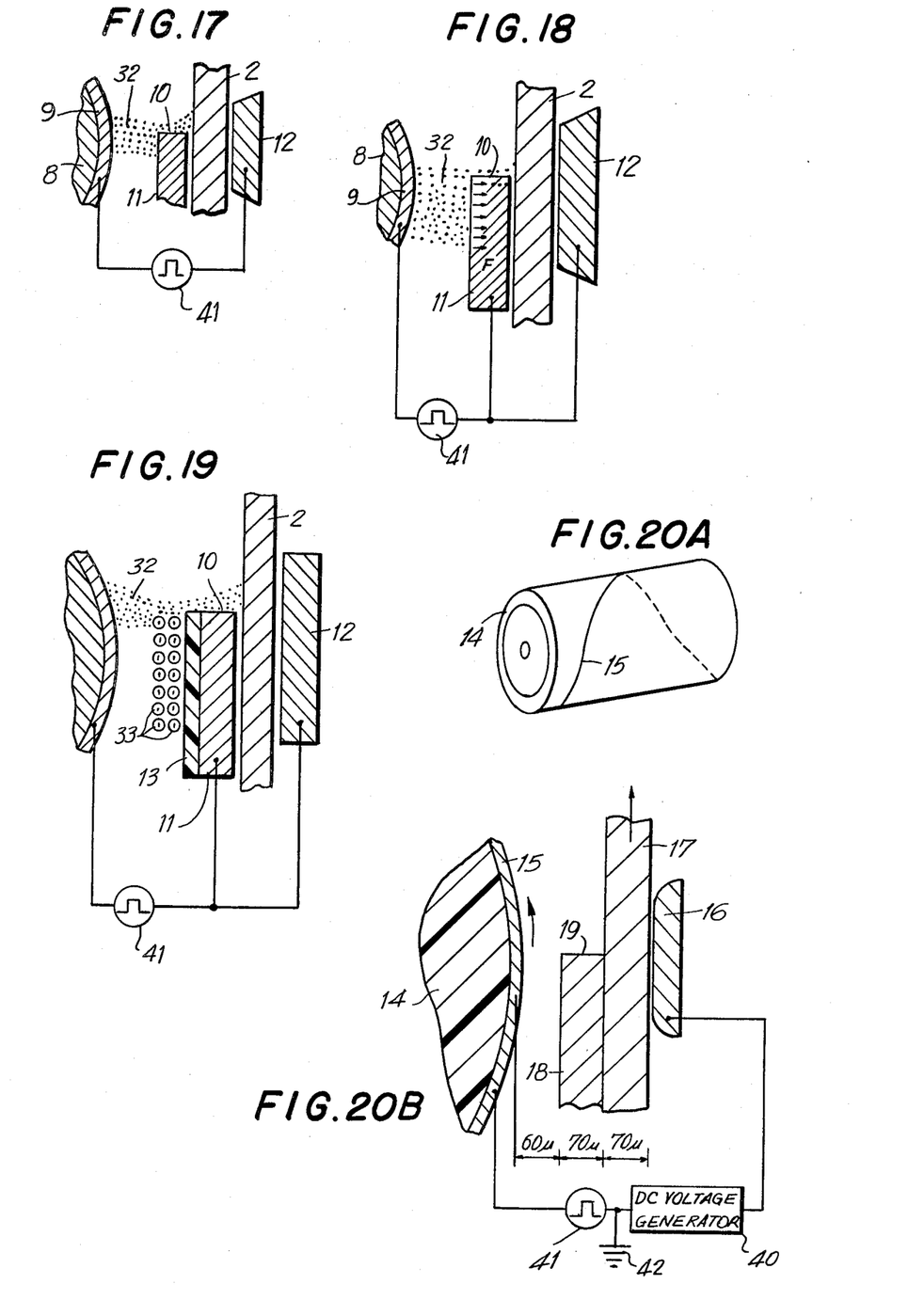
FIGS. 17, 18, 19, 20B, 21, 22, 23A, 25A and 25B ae schematic diagrams of various configurations of the electrostatic printer of the instant invention.
FIG. 20A is a perspective view of a cylindrical drum utilizable in connection with the signal generating portion of the instant invention.

Referring now to FIGS. 17, 18 and 19, the process of forming a latent image on electrostatic recording medium 2 will be explained. First, as depicted in FIG. 17, where thin layer 11 is made of insulating material and has a thickness on the order of 5μ to 5 mm, the voltage applied between line electrode 9 and back electrode 12 is so defined that the discharge of charge particles 32 from electrode 9 does not occur in the air gap between line electrode 9 and electrostatic recording medium 2 except in the vicinity where end surface 10 of thin surface 11 is located. Although end surface 10 is insulated, it has a minimum leak resistance (as compared with the insulation resistance of the air in the gap), so that the effective air gap is effectively much shorter.

The discharge of electrode 9 accordingly occurs in the region where electrode 9 and end surface 10 of thin layer 11 are arranged closest to each other, thereby producing electrical charge particles 32 in the air gap. A portion of the electric charge and charge particles 32 emitted from line electrode 9 are stored on electrostatic recording medium 2, along end surface 10 of thin layer 11 and a latent image is accordingly formed on electrostatic recording medium 2. Thus, thin layer 11 being made of insulating material and having an insulated end surface 10 reduces the effective gap length, thereby allowing the discharge of charged particles and restricting that discharge from spreading out of the region where line electrode 9 is the closest to end surface 10 of thin layer 11. Thereby, precise dot images are obtained on electrostatic recording medium 2.

Figure 23A:
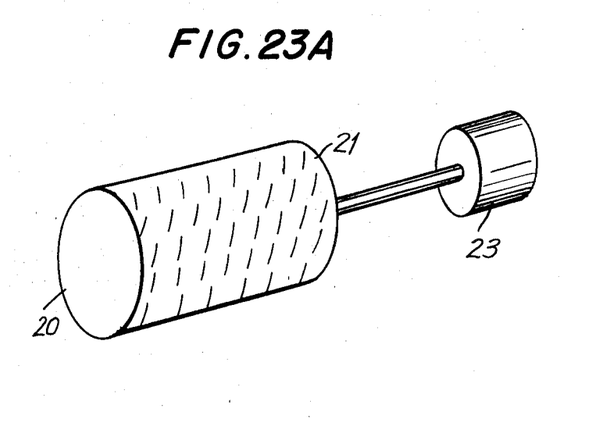
Figure 23B:
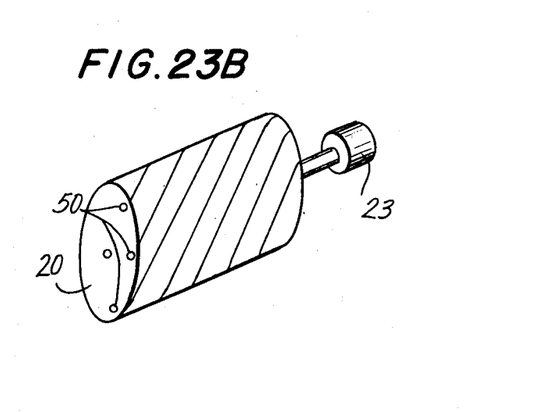
FIG. 23B is a perspective view of a cylinder and motor combination of the signal generating portion of the electrostatic printer of the instant invention.

As cylindrical drum 8 is caused to rotate by a motor 27 as depicted in FIG. 23B, different points along elongated electrode 9 will define the region where the effective gap length is reduced, and images will be formed across an entire line of paper 2. As the paper 2 advances, each consecutive line will be printed, with the dots eventually forming the desired characters. It is noted that a signal generator 41 is coupled between line electrode 9 and back electrode 12 thereby providing a potential difference therebetween for providing the discharge of charged particles 32. Additionally, as depicted in FIG. 16B, a DC generator can be coupled intermediate back electrode 12 and signal generator 41 for boosting the signal from signal generator 41. A ground 42 is also provided to complete the circuit.

Figure 15B:
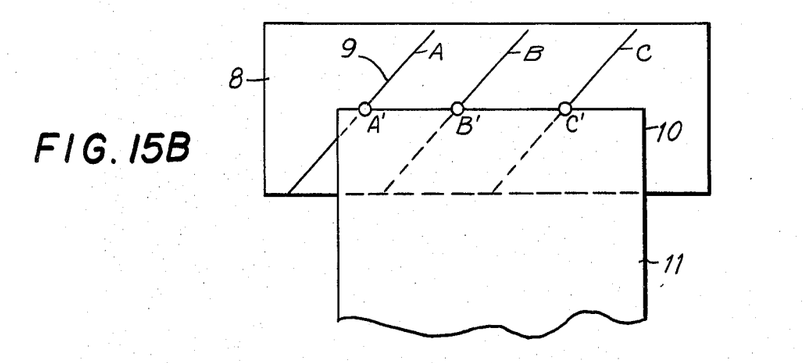
FIGS. 15B and 15C are front plan views of the signal generating portion of the electrostatic printer of the instant invention.
Figure 15C:
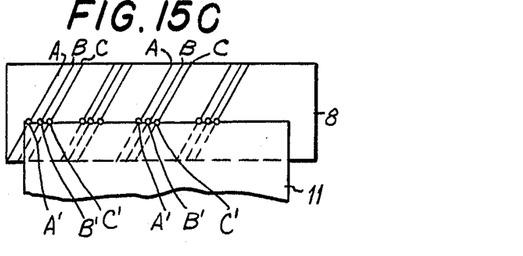

As illustrated in FIGS. 15B and 15C when drum 8 rotates the line electrode 9 moves from position A to position B and into position C as time lapses. The imaginary intersection of end surface 10 of thin layer 11 and line electrode 9 similarly moves from position A to poition B into position C, thereby forming dots at the points corresponding to the points A′, B′ and C′ on electrostatic recording paper 2 in time sequence.

Referring now to FIG. 18, an embodiment where thin layer 11 is constructed from a conductive material and has a thickness of between 5μ and 5 mm is described. As depicted in FIG. 18, thin layer 11 has a fixed potential due to the fact that signal generator 41 is coupled thereto in addition to being coupled to line electrode 9 and back plate 12. The signal voltage applied by signal generator 41 between line electrode 9 and back electrode 12 is so defined that the discharge of particles does not occur in the air gap except in the vicinity of end 10 of thin layer 11. However, line electrode 9 will discharge into the air gap between line electrode 9 and thin layer 11 when thin layer 11 is inserted between back electrode 12 and line electrode 9. The discharge occurs in the region where the gap between elongated electrode 9 and thin layer 11 is at a minimum. Substantially all the electric charge produced below end surface 10 will be absorbed into thin layer 11, but the portion of electric charge particles 32 near end surface 10 of thin layer 11 are directed to electrostatic recording medium 2 due to the lines of electric force F pointing in the direction of back electrode 12. Accordingly, the charged particles are deposited on electrostatic recording medium 2, a latent dot image being formed thereby.

When thin layer 11 is conductive as described above, and is coupled to signal generator 41, thin layer 11 acts as a controller which controls the start of discharge from electrode 9 and the discharging area where the discharge is to occur. The electrostatic recording medium 2 stores the directed charge as a latent image thereon.

Referring now to FIG. 19, an embodiment is illustrative with thin layer 11 being made of a conductive material having a thickness from 5μ to 5 mm and coated with an insulation coating layer 13 having a thickness between 5μ and 5 mm on the side of thin layer 11 closest to line electrode 9. Similar results are produced as in the aforementioned embodiment where thin layer 11 is a conductive material and the signal generator 41 is coupled thereto, thereby fixing the potential thereof. However, since an insulation layer 13 is provided on thin layer 11, the electrical charges 33 are rapidly stored on insulation coating layer 13 during the discharge of electrode 9 and a reverse bias is formed, thereby stopping the discharge in the region where the reverse bias is generated and restraining the electric charge from being absorbed into end surface 10 of thin layer 11 thereby repulsing the electrical charge. Therefore, electrical charges generated by the discharge of line electrode 9 are easily directed to and reach electrostatic recording medium 2 to form latent dot images thereon.

Figure 26A:
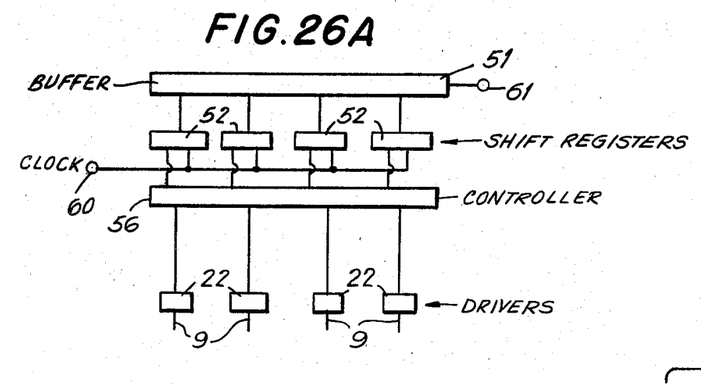
FIG. 26A is a circuit diagram of the driving control circuit of the instant invention.

Referring now to FIG. 26A the driving control circuit which selectively drives the electrostatic printer of the instant invention will be explained. Assuming that there are four elongated electrodes 9, four drivers 22 are respectively connected to the four line electrodes 9. The external signals for printing across an entire line on the electrostatic recording medium 2 are stored in a buffer 51, the outputs of buffer 51 being transmitted to four shift registers 52. The data in each shift register 52 is serially read out in parallel in response to a clock signal 60 applied to each shift register 52, respectively. The outputs of each shift register 52 are respectfully coupled to the four drivers 22.

Figure 26B:
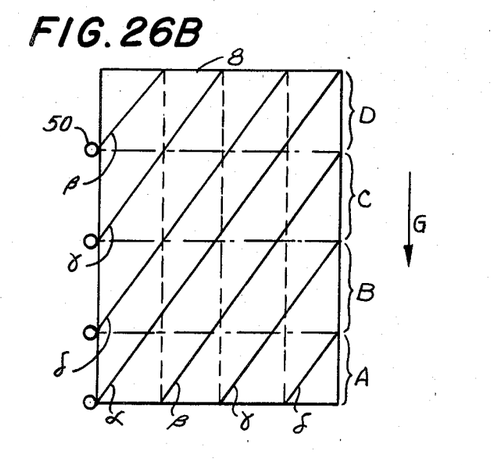
FIG. 26B is a development view of FIG. 5.
Figure 26C:
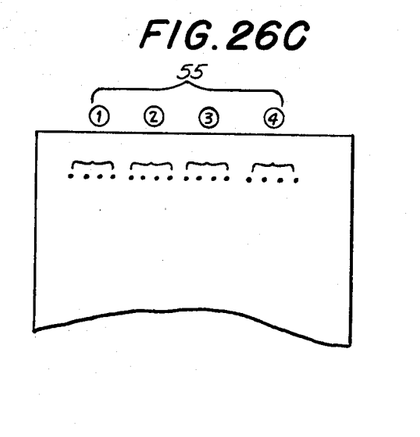
FIG. 26C is representative diagram illustrating the printing of dots on an electrostatic medium.

As depicted in FIGS. 26B and 26C, the method of printing across an entire line on electrostatic paper 2, is illustrated. When section A is the area where the discharge from electrodes 9 is to occur, the outputs of the shift registers 52 are controlled by a controller 56 so that the signals for the blocks ①, ②, ③ and ④, as depicted in FIG. 26C, in an electrostatic recording medium 55, are applied from each shift register 52 to the four line electrodes α, β, γ and δ, respectively, which accordingly print the first dot in each group of four dots ①, ②, ③ and ④. As the cylindrical drum 8 rotates in the direction of arrow G indicated in FIG. 26B, the section which will discharge and accordingly contribute to the printing shifts to region B. The signals of the blocks ②, ③, ④ and ① in electrostatic recording medium 55 are applied to the line electrodes α, β, γ and δ, respectively, in response to the signal received by light detecting members 50. For example, clock generator 50a can produce a timing signal which is reflected off of light detecting member 50 and received by clock generator 50a which acts as a timing mechanism for controlling the operation of the shift register 52. Accordingly, the second dot in each of the regions ②, ③, ④ and ① will be formed. Accordingly, the applied signals are shifted for each block successively, which returns to the first region after one complete rotation of the drum. Consequently, printing for four series of dots will be completed.

Figure 26D:
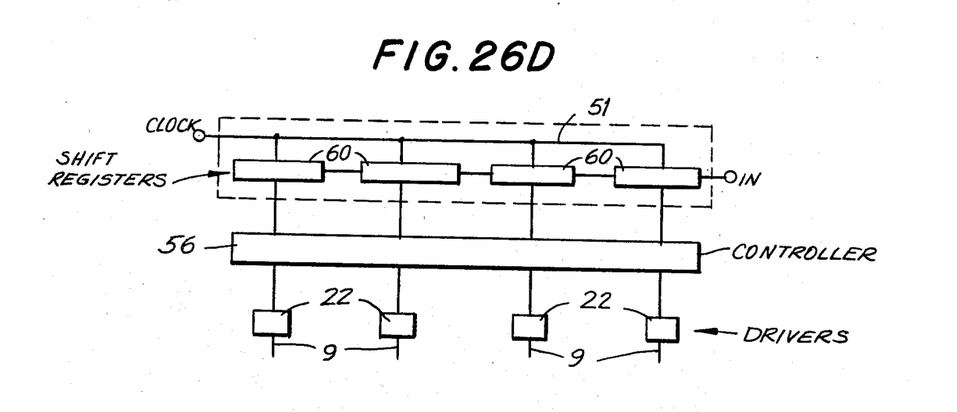
FIG. 26D is a circuit diagram of a driver control circuit constructed in accordance with an alternative embodiment of the instant invention.

Referring now to FIG. 26D, an embodiment of the driving circuit where independent shift registers 52 are omitted, is explained. In this case, buffer 51 stores the external signals for one line and consists of four shift registers 60. The data signals are serially applied to shift registers 60 which are subsequently serially read out in parallel form therefrom. The outputs from the shift registers are read into a controller 56, which controller applies these signals to the drivers 22. A clock signal is applied to the shift registers 60 in order to time the read out from shift registers 60.

Since the firing voltage for electrostatic recording has a very high threshold level which is represented on a Paschen curve, it is unnecessary to reduce the applied voltage to zero at the time when no signal is to be applied to the electrodes 9.

Since it is difficult to produce a very high frequency signal having a pulse width of less than $1\mu$ second and a voltage of 300 V, where the firing voltage of 800 V is used as in the instant invention, a DC voltage generator 40 as depicted in FIG. 16B can produce a pulse having a voltage of 500 V and the pulse signal generator 41 can produce a pulse of 300 V thereby providing the voltage of 800 V required. The circuit is grounded between DC voltage generator 40 and pulse signal generator 41 thereby avoiding any interference due to electrical waves caused by the floating of the terminal $L_o$ of the pulse signal generator 41.

As discussed above, if signal forming portion 85 includes thin layer 11 having an end surface 10, smaller circular dots can be finely formed on electrostatic recording medium 2 without the use of pin electrodes or multi-stylus pin electrodes for printing as utilized in the prior art electrostatic printers. Since line electrodes 9 are used as the printing electrode in the present invention, only one driver is required for each elongated electrode 9 and since a large number of line electrodes 9 are not required as compared to the number of pin electrode in a multi-stylus of the prior art, the electrostatic printer of the instant invention is simply constructed and high speed printing is possible.

Figure 29A:
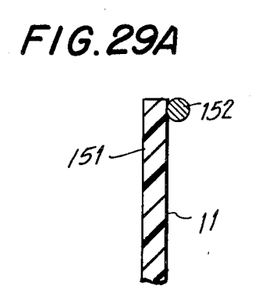
FIGS. 29A, 29B and 29C are partial sectional views of gap reducing members constructed in accordance with alternative embodiments of the instant invention.
Figure 29B:
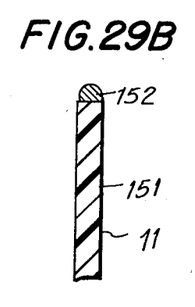
Figure 29C:
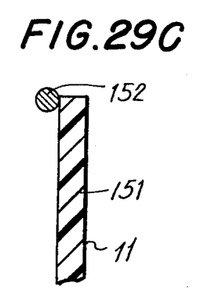

Referring now to FIGS. 29A, 29B and 29C, alternative thin layer 11 constructions having an insulation layer are depicted. In FIGS. 29A, 29B and 29C, a conductive line material 152 is coupled to an insulating medium 151. Conductive material 152 may be a wire connected to insulating material 151 in the locations depicted.

Figure 6:
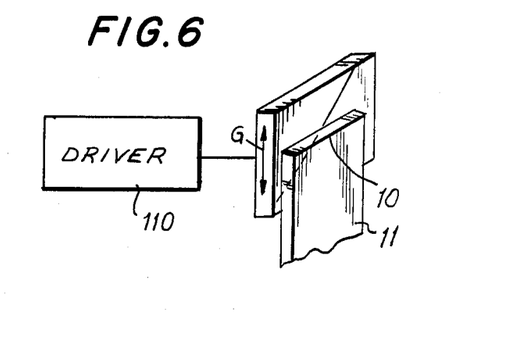
FIG. 6 is a perspective view of an alternative embodiment of the signal generating portion of the electrostatic printer constructed in accordance with the instant invention.

Instead of using a cylindrical drum 8, a flat plate 7 as depicted in FIG. 7 can be utilized. As illustrated in FIG. 6, thin layer 11 is proximately spaced from and substantially parallel to flat plate 7. A driver 110 is coupled to flat plate 7 so that flat plate 7 reciprocates in a vertical direction to end surface 10 in the direction of arrow G to allow for the printing across an entire line.

EXAMPLE I

Figure 24:
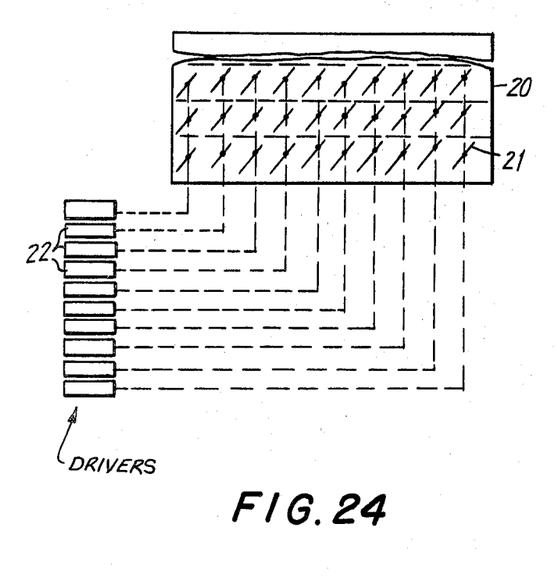
FIG. 24 is a representative schematic diagram of the driver circuit of the instant invention shown driving the conductive electrodes.
Figure 25A:
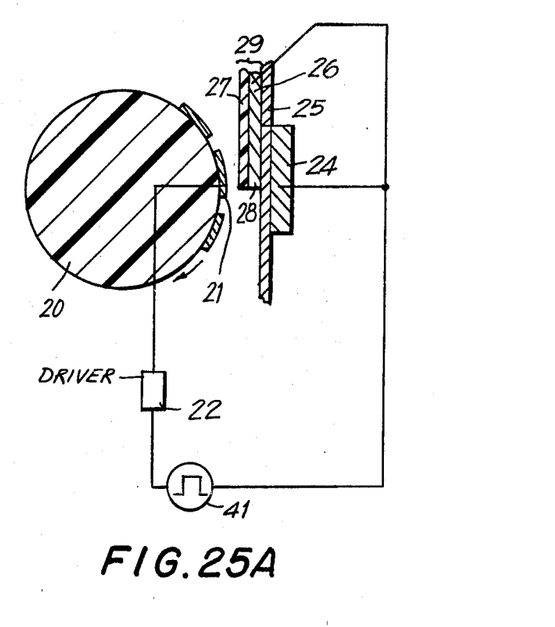
Figure 25B:
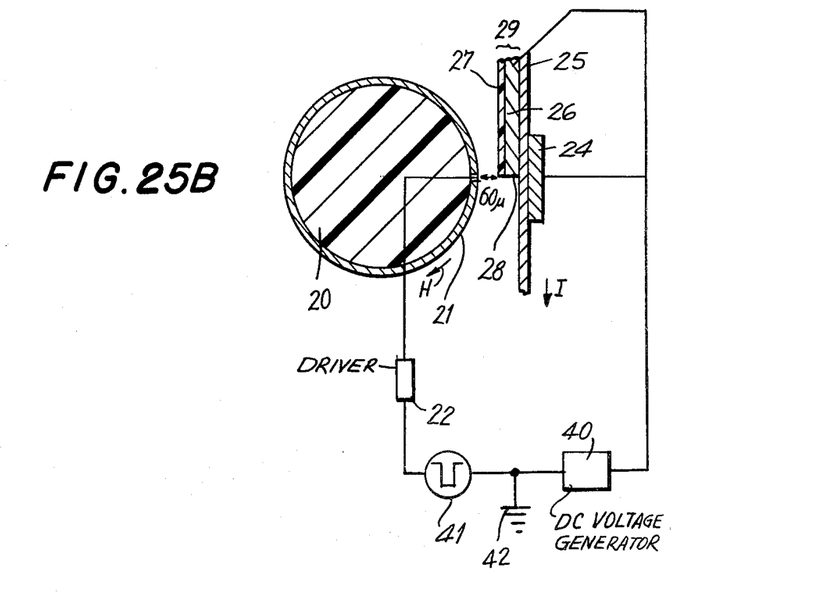

As depicted in FIGS. 23B, 24 and 25B, ten wire electrodes 21 are spirally wound on an acetal resin drum 20. Acetal resin drum 20 has a diameter of 80 mm and length of 250 mm. Wires 21 have a diameter of $30\mu$ and ten drivers 22 are respectfully connected to each wire 21. A motor 23 which drives drum 20 around its axis at 3000 rpm (revolutions per minute) is coupled to drum 20. A back electrode 24 is fixed so that the shortest air gap between wire 21 on drum 20 and back electrode 24 is $200\mu$. The drum is caused to rotate in a clockwise direction as indicated by arrow H. A thin layer 29 having an end surface 28 is disposed intermediate drum 20 and back electrode 24. Thin layer 29 includes an aluminum film 26 which is $50\mu$ thick and a resin layer 27, which is $20\mu$ thick, coated thereon. Electrostatic recording paper 25 is fed at a rate of 50 mm/second, recording paper 25 being in contact with back electrode 24. The paper is fed in the direction of arrow I in a downward direction. It is noted that resin layer 27 of thin layer 29 is closest to wire 21 on drum 20 and end surface 28 is placed in the area of the shortest air gap between wire 21 and back electrode 24. It is further noted that thin layer 29 contacts electrostatic paper 25 so that electrostatic paper 25 passes between thin layer 29 and back electrode 24. The air gap between aluminum wire 21 and thin layer 29 is $60\mu$.

DC voltage generating portion 40 which produces a voltage having a value of 700 V in respect to ground, is connected to the back electrode 24 and to thin layer 29. Pulse signal generating portion 41 which produces a pulse having a pulse width of $10\mu$ seconds and a voltage of $-300$ V (with respect to ground) is connected to the drivers 22. After successive printing with the above specifications, substantially circular dots having a diameter of 100 to $150\mu$ were obtained thereby offering a high resolution printing. In this example, the printing was performed at a writing pitch (dot spacing) of $100\mu$ (both in the vertical and horizontal directions) and a writing speed of $10^6$ dots/sec. At such a speed, ten size A 4 pages can be printed per minute.

EXAMPLE II

As depicted in FIGS. 20A and 20B, an acetal resin drum 14 on which an aluminum wire 15 having a diameter of $30\mu$ is helically wound so as to define a single circumference along the length of the drum, is positioned $200\mu$ away from a back electrode 16. An electrostatic recording paper 17 of $70\mu$ thickness and aluminum sheet 18 of $70\mu$ thickness are placed intermediate back electrode 16 and aluminum wire 15, recording paper 17 and aluminum sheet 18 being in contact with each other. In this example, an end surface 19 of aluminum sheet 18 is positioned in the region where the acetal resin drum is 14 closest to the electrostatic paper 17. The distance between aluminum sheet 18 and aluminum wire 15 on acetal resin drum 14 is $60\mu$.

Between aluminum wire 15 and aluminum sheet 18 and between aluminum wire 15 and back electrode 16, the voltage of $-700$ V is normally applied. When a high voltage signal pulse having a pulse width of 1 to $1000\mu$ sec. and a voltage of $-1000$ V was applied, a latent image was formed on electrostatic paper 17. After acetal resin drum 14 was rotated counter-clockwise, another pulse was applied in the same manner. After repeating this a plurality of times, a latent image was developed with a toner. Almost circular dots formed on recording medium 17 of a diameter of about 100μ were finely formed for each printing pulse.

EXAMPLE III

Referring now to FIGS. 23A and 25B, another example will be explained. An acetal resin drum 20 having a diameter of 80 mm and length of 250 mm, has a plurality of wires 21 having a diameter of 30μ. These wires are connected with one another and ten drivers 22 are connected thereto as depicted in FIG. 24. A motor 23 is coupled to drum 20 for driving the drum at 3000 rpm. A back electrode 24 is fixed so that the shortest air gap between wire 21 provided on drum 20 and back electrode 24 is 200μ. The electrostatic paper 25 is fed at a speed of 50 mm/sec., electrostatic paper 25 being in contact with back electrode 24. Thin layer 29, having an end surface 28, and coated with resin layer 27, having a thickness of 20 on an aluminum film 26, having a thickness of 50μ, is provided in contact with paper 25 so that resin layer 27 of thin layer 29 is placed facing wire 21. End surface 28 of thin layer 29 is disposed in the area where the air gap is at a minimum between wire 21 and back electrode 24. In this example, the air gap between aluminum wire 21 and thin layer 29 is 60μ.

DC voltage generator 40 produces a voltage having a value of 700 V with respect to ground is connected to back electrode 24 and to thin layer 29, and pulse signal generator 41 which produces a pulse width of 10μ sec. and a voltage of $-300$ V (with respect to ground) is connected to the drivers 22. After successive printing, substantially circular dots having a diameter of 100 to 150μ were obtained. Accordingly, a fine printing with a high resolution occured.

In this example, the printing was performed at writing pitch (dot spacing) of $\phi\mu$ (in the vertical and horizontal directions) and at a writing speed of $10^6$ dots/sec. At such a speed, ten size A 4 sheets can be printed per minute.

EXAMPLE IV

Figure 21:
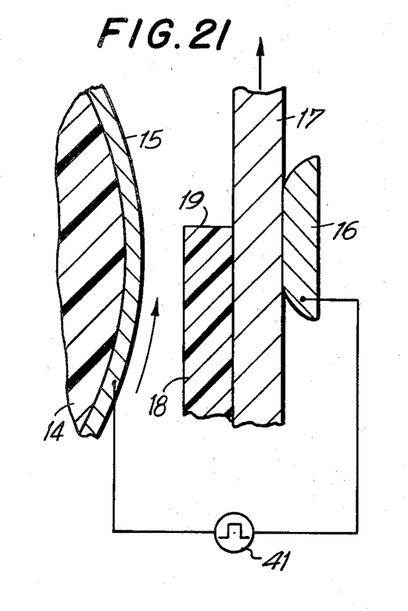

As illustrated in FIG. 21, an aluminum wire 15 having a diameter of 30μ is spirally wound on acetal resin drum 14 which is placed 200μ away from back electrode 16. Intermediate drum 14 and back electrode 16, a polyester film 18 of 70μ thickness is provided. An electrostatic paper 17 having a thickness of 70μ is disposed intermediate polyester film 18 and back electrode 16. End surface 19 of polyester film 18 is positioned in the region where acetal resin drum 14 is closest to electrostatic paper 17. The distance between polyester film 18 and aluminum wire 15 on acetal resin drum 14 is 60μ.

When a high voltage signal pulse having a pulse width of between 1 and 1000μ and voltage 1000 V was applied between aluminum wire 15 and back electrode 16, a latent image was formed on electrostatic paper 17. After acetal resin drum 14 was partially rotated, another pulse was applied in a similar matter. After repeating this several times, the latent images were developed. The circular dots formed were substantially circular and had a diameter of 100μ. Each dot was finally formed, the dispersion in the diameter of the dots was ±20%.

EXAMPLE V

Figure 22:
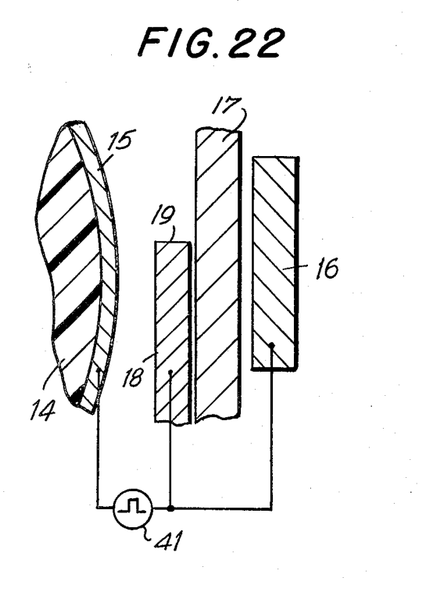

As depicted in FIG. 22, an aluminum film 19 was used instead of polyester film 18 described in the Example IV immediately above. The thickness of aluminum film 19 is 20μ and the air gap between aluminum wire 15 and aluminum film 19 is 40μ. Therefore, the air gap between aluminum wire 15 and electrostatic paper 17 is 60μ. Based on the Paschen curve showing the firing voltage, pulses having such a voltage that the discharge would occur at 40μ spacing, but not at 60μ spacing was applied. Pulses were than applied as described in the Example immediately above. Substantially circular dots having a diameter of 100μ were clearly formed. It is noted that in this example, signal generator 41 was coupled to aluminum film 19 in addition to being coupled to aluminum wire 15 and back electrode 16.

EXAMPLE VI

Instead of utilizing the aluminum film 19 in the Example V immediately above, a paper having a thickness of 100μ whose surface was impregnated with an ionic surface-active agent which reduces the resistance of the paper was utilized. The same experiment as above was made and similar results were obtained.

EXAMPLE VII

Referring now to FIG. 23A, acetal resin drum 20 having a diameter of 80 mm and a length of 250 mm, includes a plurality of wires 21 having a diameter of 30μ which are spirally wound around drum 20. These wires are connected with one another and ten drivers 22 are connected thereto as shown in FIG. 24. A motor 23 causes drum 20 to rotate at 3000 rpm.

With reference to FIG. 25A, a back electrode 24 is fixed so that the shortest air gap between any wire 21 on drum 20 and the back electrode is 200μ. Electrostatic paper 25 is fed at a speed of 50 mm/sec., being in contact with back electrode 24. A thin layer 29, having an end surface 28 and coated with resin layer 27 of 20μ thickness on an aluminum film 26 of 50μ thickness, is provided in contact with paper 25 so that resin layer 27 of thin layer 29 is placed facing drum 80. End surface 28 is disposed in the region where the air gap between wire 21 and back electrode 24 is the shortest. In this example, the air gap between aluminum wire 21 and thin layer 29 is 60μ.

When a signal voltage having a pulse width of 100μ seconds, a frequency of 100 kHz and voltage of 1000 V was applied, substantially circular dots having a diameter of 100 to 150μ with very little dispersion were obtained and accordingly a fine printing occured.

The printing in this example was performed at a writing pitch (dot spacing) of 100μ (both vertical and horizontal directions) and at a writing speed of $10^6$ dots/sec., that is, at such a speed that ten sized A 4 pages can be printed per minute.

EXAMPLE VIII

In this example, in place of thin layer 29 described in the example immediately above, an electrostatic paper having a thickness of 70μ was utilized. In this case, the same results as in Example VII above were obtained.

It is noted, that although in the above embodiments and examples the electrode is placed on drum 20, it can alternatively be arranged on a loop belt which is rotated by a roller and the same results are achieved.

In accordance with the instant invention, it is unnecessary to provide expensive writing electrodes and drivers having a complicated structure of the type conventionally used in multi-stylus type electrostatic printer. As in the instant invention, if a cylindrical drum on which an elongated line electrode is spirally wound and a thin gap-reducing plate are provided, it is possible to provide a small, cheap and simply constructed printer having a high printing speed and an excellent printing quality similar to that of an expensive, high speed electrostatic printer or an optical printer. And also, the infinite printing resolution can be got in accordance with the instant invention.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electrostatic printer for printing on an electrostatic recording medium comprising an elongated electrode and a back electrode spaced from said elongated electrode to define a gap therebetween and adapted to permit the passage of said electrostatic recording medium in said gap in a predetermined direction, a gap-reducing member disposed in said gap and extending essentially transverse to the predetermined direction of passage of said recording medium, said gap-reducing member being spaced from said back electrode to permit the passage of said recording medium therebetween, said recording medium and said gap-reducing member being out of contact with said elongated electrode, said gap-reducing member effectively reducing said gap at a point on said elongated electrode, means for displacing said elongated electrode relative to said back electrode so that said point on said elongated electrode then defining said effectively reduced gap is displaced laterally of said direction of passage of said electrostatic recording medium in response to the displacement of said elongated electrode, and means for selectively applying a voltage between said elongated electrode and said back electrode for effecting printing on said electrostatic recording medium in registration with the point on said elongated electrode then defining said effectively reduced gap.

2. An electrostatic printer as claimed in claim 1, wherein said displacing means is adapted to displace said elongated electrode along a curved path defined by radii of curvature lying on an axis extending laterally to said direction of passage of said electrostatic recording medium, so that said point on said elongated electrode then defining said effectively reduced gap is displaced laterally of said direction of passage of said electrostatic recording medium.

3. An electrostatic printer as claimed in claim 2, wherein said displacing means includes cylindrical drum means and means for rotating said drum means about its cylindrical axis, said elongated electrode being spirally wound around said cylindrical drum means along the radii of curvature thereof, said cylindrical drum means being rotated around its cylindrical axis so that said point on said elongated electrode then defining said effectively reduced gap is spirally and laterally displaced relative to said direction of passage of said electrostatic recording medium along the radii of curvature of said cylindrical drum means, said point returning to its original position defining said effectively reduced gap upon one complete rotation of said cylindrical drum means.

4. An electrostatic printer as claimed in claim 3, wherein said effectively reduced gap is defined at the point on said elongated electrode essentially closest to said electrostatic recording medium where the tangent at said point on said cylindrical drum means is substantially parallel to the direction of passage of said electrostatic recording medium.

5. An electrostatic printer as claimed in claim 4, further including a plurality of spaced electrodes spirally wound around said cylindrical drum means along the radii of curvature thereof, said effectively reduced gap being defined by the points of each said elongated electrode essentially closest to said back electrode where the tangent to said points on said cylindrical drum means is substantially parallel to the direction of passage of said electrostatic recording medium, said voltage means being adapted to apply a voltage between said elongated electrodes and said back electrode for effecting printing on said electrostatic recording medium in registration with the points on said elongated electrodes then defining said effectively reduced gap.

6. An electrostatic printer as claimed in claim 5, wherein said cylindrical drum means includes first and second ends, said elongated electrodes each having first and second ends, said first end of each said elongated electrode being affixed to said first end of said cylindrical drum means, said elongated electrodes being spirally wound around said cylindrical drum means along the radii of curvature thereof so that said second end of said elongated electrode can be affixed to said second end of said cylindrical drum means, said voltage means being applied to said first end of each said elongated electrode.

7. An electrostatic printer as claimed in claim 6, wherein said gap-reducing member is a first plate means disposed intermediate said elongated electrodes and said back electrode, said first plate means being spaced from said back electrode to permit the passage of said electrostatic recording medium therebetween, said first plate means including an end, said first plate means and said end thereof being substantially transverse to the direction of passage of said electrostatic recording medium, said end of said first plate means being disposed along said gap where said gap is effectively reduced to that printing is effected on said electrostatic recording medium across a line thereof, said line being defined by the projection of said end of said first plate means on said electrostatic recording medium, in registration with the points on said elongated electrodes then defining said effectively reduced gap.

8. An electrostatic printer as claimed in claim 6, wherein said gap-reducing member is a wire means disposed intermediate said elongated electrodes and said back electrode, said wire means being spaced from said back electrode to permit the passage of said electrostatic recording medium therebetween.

9. An electrostatic printer as claimed in claim 8, wherein said wire means includes two sides, said wire means being substantially transverse to the direction of passage of said electrostatic recording medium, said wire means being disposed along said gap where said gap is effectively reduced so that printing is effected on said electrostatic recording medium on both sides of said wire means as projected on said electrostatic recording medium, in registration with the points on said elongated electrodes then defining said effectively reduced gap.

10. An electrostatic printer as claimed in claim 1, wherein said gap-reducing member is a first plate means disposed intermediate said elongated electrode and said back electrode, said first plate means being spaced from said back electrode to permit the passage of said electrostatic recording medium therebetween, said first plate means including an end, said first plate means and said end thereof being substantially transverse to the direction of passage of said electrostatic recording medium, said end of said first plate means being disposed along said gap where said gap is effectively reduced.

11. An electrostatic printer as claimed in claim 1, wherein said gap-reducing member is a wire means disposed intermediate said elongated electrode and said back electrode to permit the passage of said electrostatic recording medium therebetween.

12. An electrostatic printer as claimed in claim 11, wherein said wire means includes two sides, said wire means being substantially transverse to the direction of passage of said electrostatic recording medium, said wire means being disposed along said gap where said gap is effectively reduced so that printing is effected on said electrostatic recording medium on both sides of said wire means across a line of said electrostatic recording means, said line being defined by the projection of said wire means on said electrostatic recording medium, in registration with the point of said elongated electrode then defining said effectively reduced gap.

13. An electrostatic printer as claimed in claim 10, wherein said displacing means includes second plate means having a surface facing said electrostatic recording medium, and means for reciprocating said second plate means, said elongated electrode being secured to said surface of said second plate means so that said point on said elongated electrode then defining said effectively reduced gap is displaced laterally of said direction of passage of said electrostatic recording medium as said second plate means reciprocates in response to said reciprocating means.

14. An electrostatic printer as claimed in claim 13, further including a plurality of spaced elongated electrodes secured to said surface of said second plate means, said second plate means having an end, said elongated electrodes defining an angle with said end of said second plate means, said voltage means being adapted to selectively apply to voltage between said elongated electrodes and said back electrode for effecting printing on said electrostatic recording medium in registration with the points on said elongated electrodes then defining said effectively reduced gap along a line defined by the projection of said end of said first plate means onto said electrostatic recording medium.

15. An electrostatic printer as claimed in claims 6 or 14, wherein said voltage means includes signal generating means for generating a signal for charging said elongated electrodes with respect to said back electrode and booster means for boosting the signal generated by said signal generating means.

16. An electrostatic printer as claimed in claims 6 or 14, wherein said voltage means includes drive means for driving said elongated electrodes, said drive means including buffer means for storing external signals, said displacing means including detecting means for producing timing signals responsive to the position of said displacing means, said buffer means being adapted to produce an output in response to the external signals stored therein, shift register means for receiving said output of said buffer means, said shift register means being adapted to produce an output responsive to said output of said buffer means in response to said timing signals, driver means for receiving said output of said shift register means, said driver means being coupled to said elongated electrodes for driving said elongated electrodes in response to said output from said shift register means.

17. An electrostatic printer as claimed in claim 16, wherein said driver means includes a plurality of drivers equal in number to the number of said elongated electrodes, one said elongated electrode being coupled to one said driver respectively, said shift register means including a plurality of shift registers equal in number to the number of said drivers, one said shift register being coupled to one said driver, said buffer means being adapted to produce a plurality of output signals, one said output signal being received by one said shift register.

18. An electrostatic printer as claimed in claims 6 or 14 wherein said voltage means includes drive means, said drive means including buffer means for storing external signals, said buffer means including a plurality of series connected shift register means, said displacing means including detecting means for producing timing signals responsive to the position of said displacing means, each said shift register means producing an output in response to said timing signals, and a plurality of driver means for receiving said outputs of said shift register means, one said driver means being respectfully coupled to one said elongated electrode for driving said elongated electrodes.

19. An electrostatic printer as claimed in claim 16, wherein said detecting means includes means for detecting the position of said elongated electrodes.

20. An electrostatic printer as claimed in claim 18, wherein said detecting means includes means for detecting the position of said elongated electrodes.

21. An electrostatic printer as claimed in claim 2, wherein said displacing means includes loop belt means and means for rotating said belt means, said elongated electrode being wound around said belt means along said curved path, said loop belt means being rotated so that said point on said elongated electrode then defining said effectively reduced gap is laterally displaced relative to said direction of passage of said electrostatic recording medium along said radii of curvature.

22. An electrostatic printer as claimed in claims 7, 10 or 14, wherein said first plate means is insulated.

23. An electrostatic printer as claimed in claims 7, 10 or 14, wherein said first plate means is formed from an insulating material.

24. An electrostatic printer as claimed in claims 7, 10 or 14, wherein said first plate means is conductive, said voltage means being coupled to said first plate means for effecting a potential between said elongated electrodes and said first plate means.

25. An electrostatic printer as claimed in claim 23, wherein said end of said first plate means includes a conductive strip means along the lengthwise extent thereof.

26. An electrostatic printer as claimed in claim 24, wherein said voltage means includes signal generating means for generating a signal for charging said elongated electrodes with respect to said back electrode and said first plate means, and booster means for boosting the signal generated by said signal generating means.

27. An electrostatic printer as claimed in claim 26, wherein said voltage means is grounded.

28. An electrostatic printer as claimed in claim 23, wherein said first plate means has a thickness between 5µ and 5 mm.

29. An electrostatic printer as claimed in claim 24, wherein said first plate means has a thickness between 5µ and 5 mm.

30. An electrostatic printer as claimed in claims 7, 10 or 14, wherein said first plate means includes a thin layer of conductive material and an insulating layer, said insulating layer having a thickness between 5µ and 5 mm, said thin layer of conductive material facing said electrostatic recording medium.

31. An electrostatic printer as claimed in claims 8 or 11, wherein said wire means is conductive.

32. An electrostatic printer as claimed in claim 5, wherein said gap-reducing member includes an ionic surface-active agent impregnated on said electrostatic recording medium.

33. The electrostatic printer as claimed in claim 1, wherein said gap-reducing member is continuous, said elongated electrode being inclined with respect to said continuous member.

34. The electrostatic printer as claimed in claim 33, wherein said point on said elongated electrode defining said reduced gap is displaced along said continuous member by said displacing means due to the inclination of said elongated electrode.

35. The electrostatic printer as claimed in claim 33, wherein said elongated electrode is displaced by said displacing means while said voltage is applied to said elongated electrode.

* * * * *